United States Patent [19]

Hallard et al.

[11] Patent Number: 5,346,249
[45] Date of Patent: Sep. 13, 1994

[54] AIRBAG COVER HINGE REINFORCEMENT FOR HIGH PERFORMANCE INFLATOR

[75] Inventors: Alain F. Hallard, Cisse, France; John E. Allard, North Ogden, Utah

[73] Assignee: Morton International, Inc., Chicago, Ill.

[21] Appl. No.: 93,815

[22] Filed: Jul. 16, 1993

[30] Foreign Application Priority Data

Aug. 7, 1992 [FR] France .............................. 92 08929

[51] Int. Cl.5 ............................................ B60R 21/08
[52] U.S. Cl. .................................. 280/728 B; 280/732
[58] Field of Search ............... 280/728 A, 728 B, 731, 280/732, 743 R, 743 A

[56] References Cited

U.S. PATENT DOCUMENTS

| | | | |
|---|---|---|---|
| 3,199,913 | 8/1965 | Field et al. | 296/97.1 |
| 3,551,940 | 8/1968 | Edison | 16/225 |
| 3,656,790 | 4/1972 | Truesdell | 293/107 |
| 3,767,229 | 10/1973 | Cain | 280/732 |
| 3,880,447 | 4/1975 | Thorn et al. | 280/740 |
| 3,910,595 | 10/1975 | Katter et al. | 280/732 |
| 3,944,250 | 3/1976 | Wulf et al. | 280/732 |
| 4,101,146 | 7/1978 | Oehm | 280/731 |
| 4,148,503 | 4/1979 | Shiratori et al. | 280/731 |
| 4,183,550 | 1/1980 | Sudou | 280/728 A |
| 4,327,937 | 5/1982 | Scholz et al. | 280/732 |
| 4,400,010 | 8/1983 | Stutz et al. | 280/732 |
| 4,414,705 | 11/1983 | Ostrowsky | 16/225 |
| 4,632,135 | 9/1969 | Chute et al. | 280/731 |
| 4,968,057 | 11/1990 | Rafferty | 280/731 |
| 5,044,663 | 9/1991 | Seizert | 280/730 R |
| 5,069,477 | 12/1991 | Shiraki | 280/732 |

FOREIGN PATENT DOCUMENTS

| | | |
|---|---|---|
| 2425659 | 12/1975 | Fed. Rep. of Germany. |
| 2848547 | 11/1978 | Fed. Rep. of Germany. |
| 4024189 | 7/1990 | Fed. Rep. of Germany. |

*Primary Examiner*—Kenneth R. Rice
*Attorney, Agent, or Firm*—Gerald K. White

[57] ABSTRACT

The present invention is directed toward a cosmetic container or enclosure for a high performance inflatable air bag utilizing a new and improved hinge structure especially designed to allow a cover to be fractured into pivotally openable panels or doors adapted to open during inflation of the air bag but yet the hinges are strong enough to positively retain the panels of the cover to a fixed portion of the container after opening occurs so that damage to the air bag or injury to persons does not result with the consequent adverse affects to the safety and operation of the air bag deployment.

23 Claims, 6 Drawing Sheets

AIRBAG COVER HINGE REINFORCEMENT FOR HIGH PERFORMANCE INFLATOR

BACKGROUND OF THE INVENTION

1. Field of the Invention

The present invention relates to a new and improved, cosmetic, container or enclosure for a driver's side module of a high performance type air bag or inflator. More particularly, the present invention is directed towards a new and improved air bag container having a novel hinge structure especially designed for use with a high performance inflator. The hinge is effective to retain a cover or panel of the enclosure during and after deployment of the air bag even though hot and cold environmental conditions obtain and yet readily permit the cover or panel to open under the pressure of air bag inflation. The open panel or cover is retained against separation from the enclosure side wall so as to prevent damage to the air bag or injury to the occupants in the vehicle in which the air bag is deployed.

2. Background of the Prior Art

U.S. Pat. No. 3,199,913 discloses a vehicle sun shade or visor wherein the article is formed substantially entirely of molded plastic material with an integral hinge therein permitting vertical and horizontal movement of the sun shade as desired.

U.S. Pat. No. 3,551,940 discloses a box hinge for use with containers and packaging enclosure employing a hinge integrally formed of plastic sheet material permitting flexibility and a relatively wide range of pivotal movement without breakage or distortion.

U.S. Pat. No. 3,767,229 discloses an inflatable dash panel construction for protecting automobile occupants in collisions and the like wherein a one-piece element of relatively thick material is provided as a padded dash assembly and which element is designed to provide a supportive cushion to protect an occupant upon inflation of a chamber behind the element.

U.S. Pat. No. 4,183,550 is directed towards an air bag holding container which has an improved shearing resistance in an area surrounding a gas generator.

U.S. Pat. No. 4,414,705 discloses an integral thermoplastic biasing hinge useful for container caps or tops and is adapted to retain the top or cap either in a fully closed or in a fully open position.

U.S. Pat. No. 4,968,057 discloses a cover assembly for an air bag unit including first and second separate door members, each having a polyvinylchloride outer shell, a urethane foam pad and a yieldable thin metal back plate.

U.S. Pat. No. 5,044,663 discloses a blow molded air bag having internal fabric reinforcements for providing supplemental support during inflation.

U.S. Pat. No. 5,069,477 discloses a pad for an air bag device including a reinforcing metallic member embedded in at least a front and rear side wall of an insert member made of synthetic resin.

A problem for air bag containers utilized for holding high performance inflators has been the tendency of pieces or parts of a cover member especially when formed of metal to come loose and inadvertently cut or slice open the air bag during the inflation process and/or strike occupants of the vehicle causing injury. These types of problems have tended to limit the overall safety characteristics of many air bag enclosures.

Another problem encountered with prior art air bag enclosures is the fact that sometimes a cover portion of the air bag enclosure must be fractured or broken away from the main body of the enclosure retained on the steering wheel in order for the air bag to deploy and if the fractured portion thereafter becomes separated from the rapidly inflating air bag, it could be propelled or move away in a variety of uncontrolled directions to possibly cause injury to an occupant or damage the interior of the vehicle.

Yet another problem with prior art air bag enclosures is that it is difficult to provide a high performance cover for a driver side module that is also pleasing in design or appearance, and wherein the cover panel is stiff, flat and able to withstand normal driving abuse without breaking yet does not tear or cut open an air bag while the bag is being deployed. In high performance types of air bag inflators, attempts at using plastic injection molded reinforcement elements rather than metal reinforcing plates have been successful to some extent when operated at non-severe temperature conditions, but many times these air bag enclosures have failed in the region of hinged attachment of a door or panel to a stationary position of the enclosure when deployed at relatively extreme or severe hot or cold conditions.

OBJECTS OF THE INVENTION

It is therefore an object of the present invention to provide a new and improved air bag container or enclosure and more particularly a new and improved hinge system for a high performance air bag inflator, which hinge system insures that the air bag is firmly retained behind a relatively strong cover panel structure while not in use and yet which cover panel will permit rapid deployment of the air bag in a manner whereby the panel portions that hinge open are positively retained with a fixed portion of an enclosure so as not to cause injury to occupants of the vehicle, and/or damage to the air bag itself or the interior of the vehicle.

Yet another object of the present invention is to provide a new and improved hinge system for use with an openable cover of a container for a high performance inflatable air bag, which hinge system permits a wide angle of pivotal movement of an opening panel so as to provide little or no interference with a rapid deployment of the air bag during inflation and yet at the same time provides for positive retainment of the opened panel or door with a fixed wall portion of the enclosure.

Yet another object of the present invention is to provide a new and improved hinge structure that is useful in connection with a stiffening or reinforcing element provided in a front face or cover panel of an air bag containing enclosure.

Still another object of the present invention is to provide a new and improved air bag container of the type described which is pleasing to the eye, especially reliable and safe in operation and which can be constructed and installed on an economical basis to provide a highly effective safety device for use in motor vehicles and the like.

Still another object of the present invention is to provide a new and improved air bag container and hinge structure therefor which is effective to allow door or panel to fracture or break away along predetermined fracture lines in order to rapidly open up and yet is strong enough to withstand accelerating forces and masses involved and capable of preventing the opened door or panel from becoming a loose projectile when the air bag is deployed.

BRIEF SUMMARY OF THE PRESENT INVENTION

The foregoing and other objects and advantages of the present invention are accomplished in an illustrated embodiment comprising an enclosure or container for a high performance inflatable air bag including a fixed wall portion and an integral cover portion intersecting one another around a peripheral front edge of the enclosure. A new and improved hinge system includes a pair of spaced apart hinges. Each hinge is secured on the inside of a fixed wall portion and to a panel or door segment on the cover for retaining attachment between the two when the cover is fractured or broken away from the fixed wall portion to pivot outwardly during rapid inflation of the air bag. Each hinge is formed of a piece of scrim material comprising strong, woven, flexible fibers and having a first section attached to the cover and a second section attached to the fixed wall of the air bag enclosure. An intermediate hinge section is integral with the first and second sections and the integral hinge section includes a portion overlying one of said sections and integrally joined along a fold line extending along an edge of the enclosure or container. When the air bag is deployed, the cover is fractured along a groove adjacent the center thereby forming a pair of separate panels or doors which pivot away from one another to release the inflating air bag. The flexible scrim material of each hinge permits unfolding along a fold line but the scrim material remains positively attached to prevent the door or panel from completely separating from the fixed wall structure. Because the pivoting doors or panels never become completely detached from the fixed wall portion of the enclosure, and cuts or damage to the air bag, injuries to a person in the vehicle or damage to adjacent interior surfaces of the vehicle are precluded.

Fracture of the cover into a pair of pivotally opening doors or panels is facilitated by grooves on the inside of the cover reducing the thickness of the walls along intended lines of fracture.

Preferably, each hinge includes a plurality of overlapping web portions in an intermediate hinge section thereof and these web portions are separated from one another by a strip of tape or layer of impervious sheet material so that as the scrim material is enveloped in resinous plastic material during the molding process, the resin does not bond together the overlapping web portion when the resin solidifies. In addition, in each hinge, a strip of tape is also provided between a web portion of the hinge section and an adjacent first or second section of the hinge secured to an adjacent enclosure wall so that solidified resin does not preclude pivotal movement as a panel or door opens upon inflation of the air bag. A new and unique type of plastic stiffening element is provided to reinforce the wall structure of the air bag enclosure and the stiffening element is molded-in-place within the wall structure as it is formed with plastic resin.

BRIEF DESCRIPTION OF THE DRAWINGS

For a better understanding of the present invention, reference should be had to the following detailed description taken in conjunction with the drawings, in which.

DETAILED DESCRIPTION OF A PREFERRED EMBODIMENT OF THE INVENTION

Figure 2:
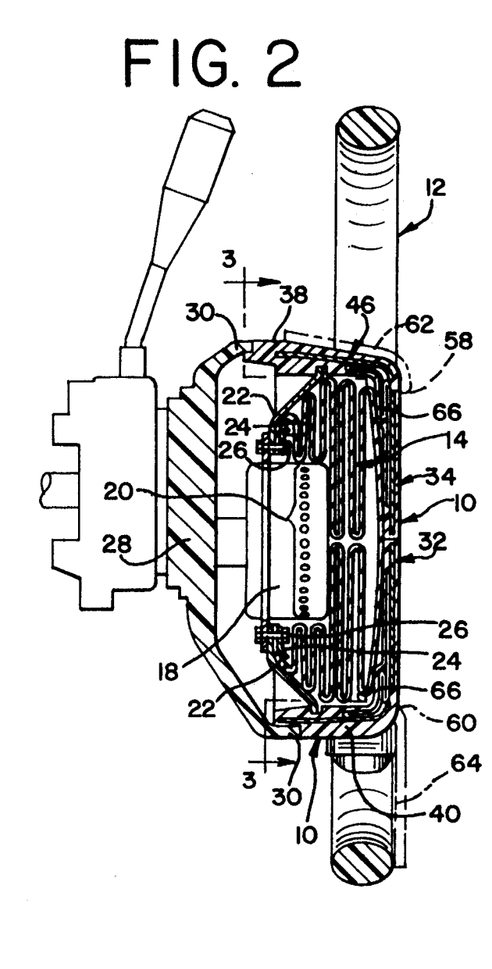
FIG. 2 is a transverse cross-sectional view taken substantially along lines 2—2 of FIG. 1.
Figure 2A:
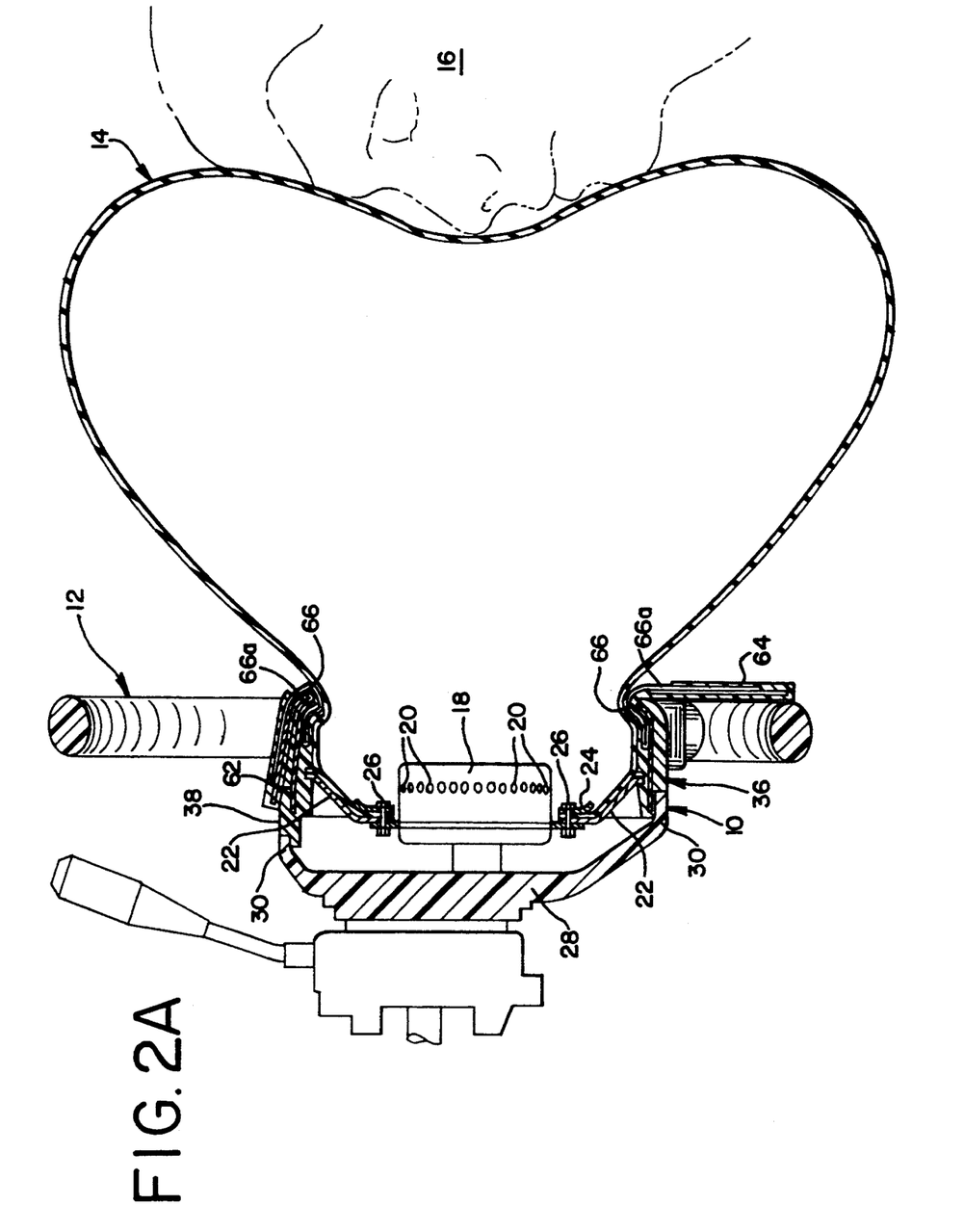
FIG. 2A is a view similar to FIG. 2 but showing the air bag container after panels have opened upon inflation and deployment of the air bag for protecting the occupant of the vehicle.

Referring now more particularly to the drawings, therein is illustrated a new and improved air bag enclosure or container 10 adapted to be mounted on a motor vehicle steering wheel 12 and designed to contain a high performance inflatable air bag 14 in a folded up condition before deployment as shown in FIG. 2. The container 10 is adapted to open up upon rapid inflation of the air bag 14 to an expanded condition as shown in FIG. 2A wherein the air bag is effective to prevent injury to a person or occupant 16 behind the steering wheel 12 in case of an accident. The air bag 14 is formed of strong, lightweight, thin, flexible plastic sheet material which is airtight and is adapted to be rapidly inflated with gas discharged through a metal inlet fitting 18 having a plurality of wall ports 20 spaced in a ring around a side wall thereof. The inlet fitting 18 is generally cylindrical and is mounted in a central opening provided in an internal back plate 22 in the air bag container 10. The back plate 22 is generally rectangular or square in a front elevational view and has a somewhat pie-shaped profile configuration in a side view (FIGS. 2 and 2A). An intermediate flange extending around the cylindrical side wall of the inflator inlet fitting 18 is secured to the back plate 22 and to a ring-like element 24 by a plurality of suitable fasteners 26 for sealing the air bag 14 around the inlet fitting in place in an airtight connection.

The air bag container 10 includes an outer back cover member 28, preferably formed of strong, lightweight, injection molded plastic resin material and supported from the steering column structure on which the steering wheel 12 is mounted. As best shown in FIGS. 2 and 2A, the outer back cover member 28 includes a forwardly extending peripheral, edge flange or side wall 30 of generally rectangular shape dimensioned to interfit and join with an outer front cover member 32, also preferably formed of a strong, lightweight injection molded plastic resin material such as a gas or foam filled, high density polyurethane resin or polyester resin.

The front cover member 32 includes a generally rectangular-shaped, relatively stiff and strong front wall 34 which is reinforced internally as will be described hereinafter and the front wall is integrally joined around peripheral edges to a continuous peripheral flange-like side wall 36 (FIG. 3) comprising an upper wall 38, a lower wall 40 and a pair of opposite side walls 42. As best shown in FIGS. 2 and 2A, rearwardly facing ends of the peripheral side wall 36 of the front cover member 32 are adapted to bond with forwardly facing ends of the peripheral wall 30 of the outer back wall structure 28 to form a tight, strong enclosure (FIG. 2) for containing the air bag 14 under normal operating conditions.

Figure 4:
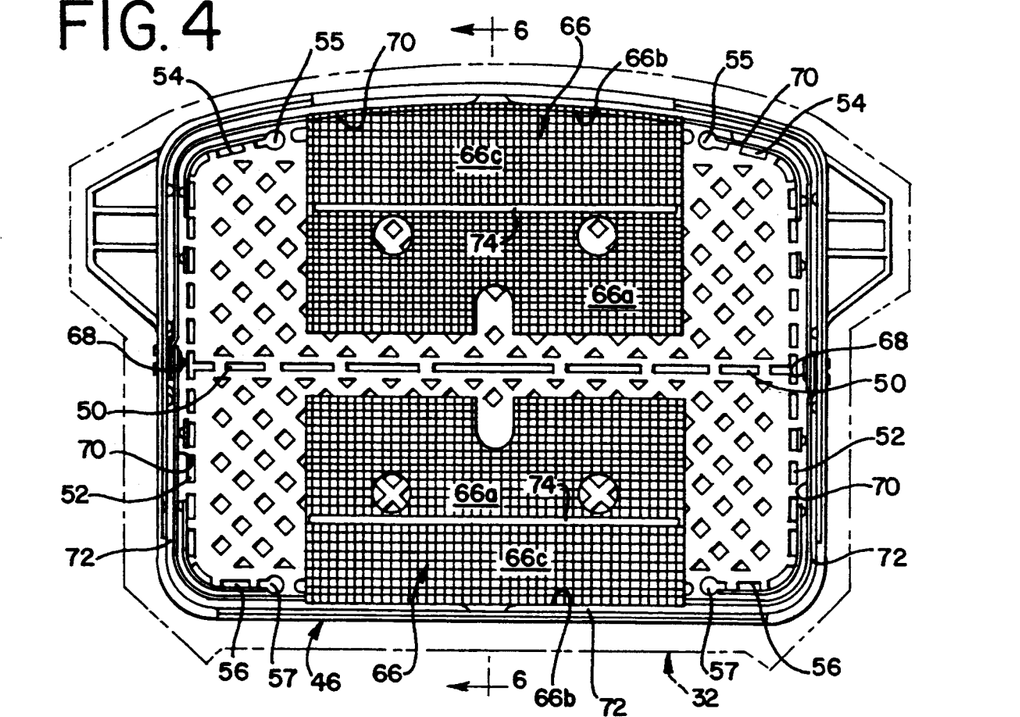
FIG. 4 is a rear side elevational view illustrating a stiffening element for the front cover adapted to be molded-in-place and showing new and unique hinges constructed in accordance with the features of the present invention mounted on the stiffening element before being joined thereto by the injection of resinous plastic material used for the walls and cover of the enclosure.
Figure 5:
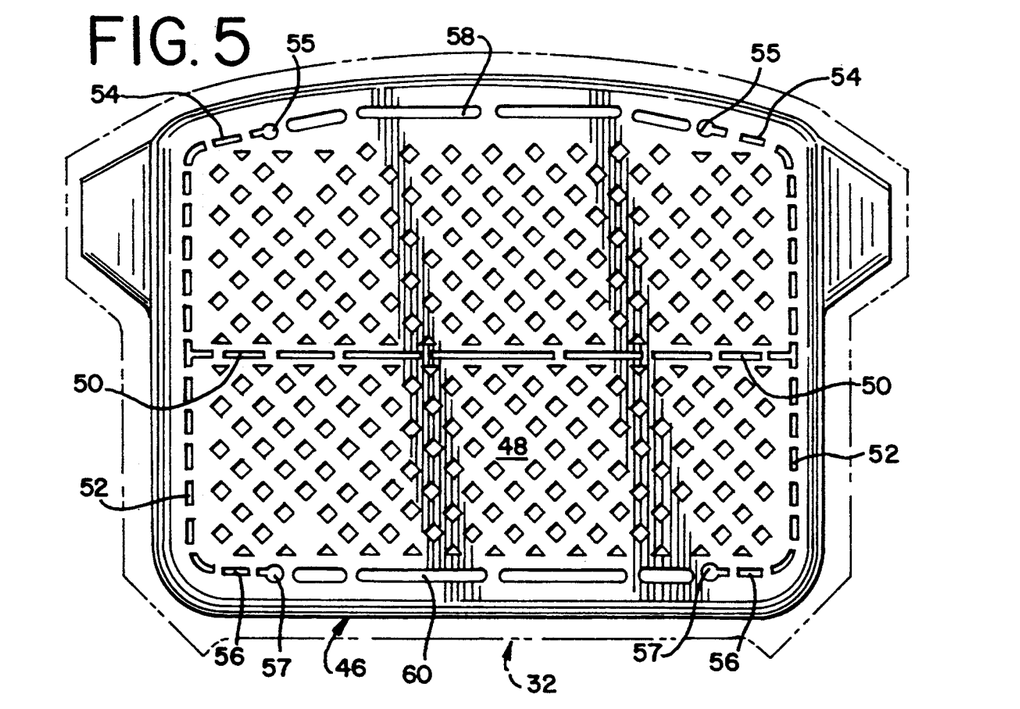
FIG. 5 is a front elevational view looking at the stiffening element of FIG. 4.
Figure 6:
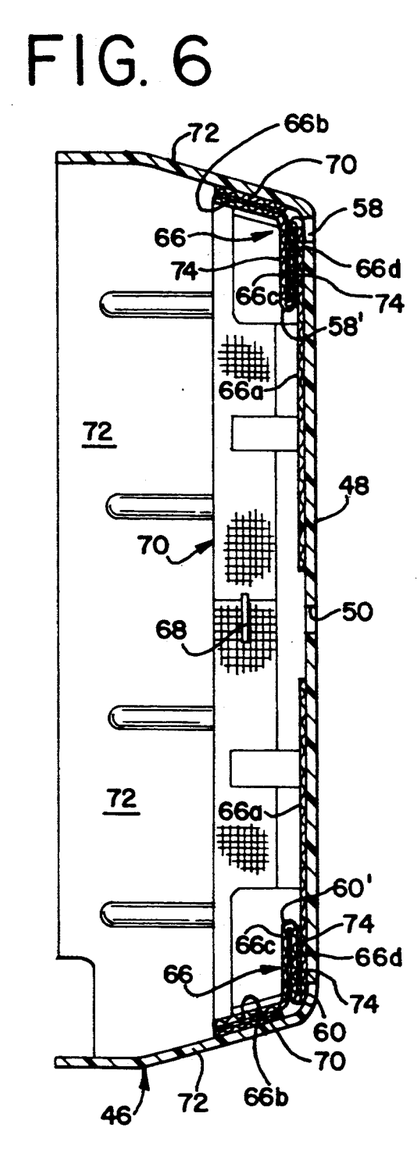
FIG. 6 is a transverse cross-sectional view taken substantially along lines 6—6 of FIG. 4 showing the hinges in place before the introduction of resinous plastic material used in forming the enclosure.

In accordance with the present invention, in order to strengthen the air bag container 10, a strengthening or reinforcing element 46 is integrally molded in place in the front cover member 32. The reinforcing member 46 is generally similar in shape to the front cover member 32 and includes a front wall 48 formed with a plurality of square and diamond-shaped openings distributed over substantially all of the surface area thereof for allowing plastic resin to pass therethrough in the molding process to form the outside surface of the front cover member 32. In addition to the plurality of small perforations, the front wall is formed with a series of aligned slots 50 extending from edge to edge at a generally mid-level or centerline as best shown in FIGS. 4, 5 and 6. In addition, the front wall 48 includes a line of slots 52 extending vertically along opposite edges and joining the opposite ends of the center line of slots 50. At the upper ends, the side edge slots 52 are joined with a pair of short oppositely inwardly directed lines of slots 54 positioned along an upper edge of the front wall 48. Inner end slots of the line of slots 54, are provided with an enlarged rounded aperture 55 as best shown in FIGS. 4 and 5, and similarly, along a lower edge of the front wall 48 of the reinforcing element 46, there is provided a pair of short oppositely inwardly directed lines of slots 56 joining the lower end of the side edge line of slots 52. Inner end slots of the line slots 56 are formed with an enlarged rounded aperture 57.

Figure 1:
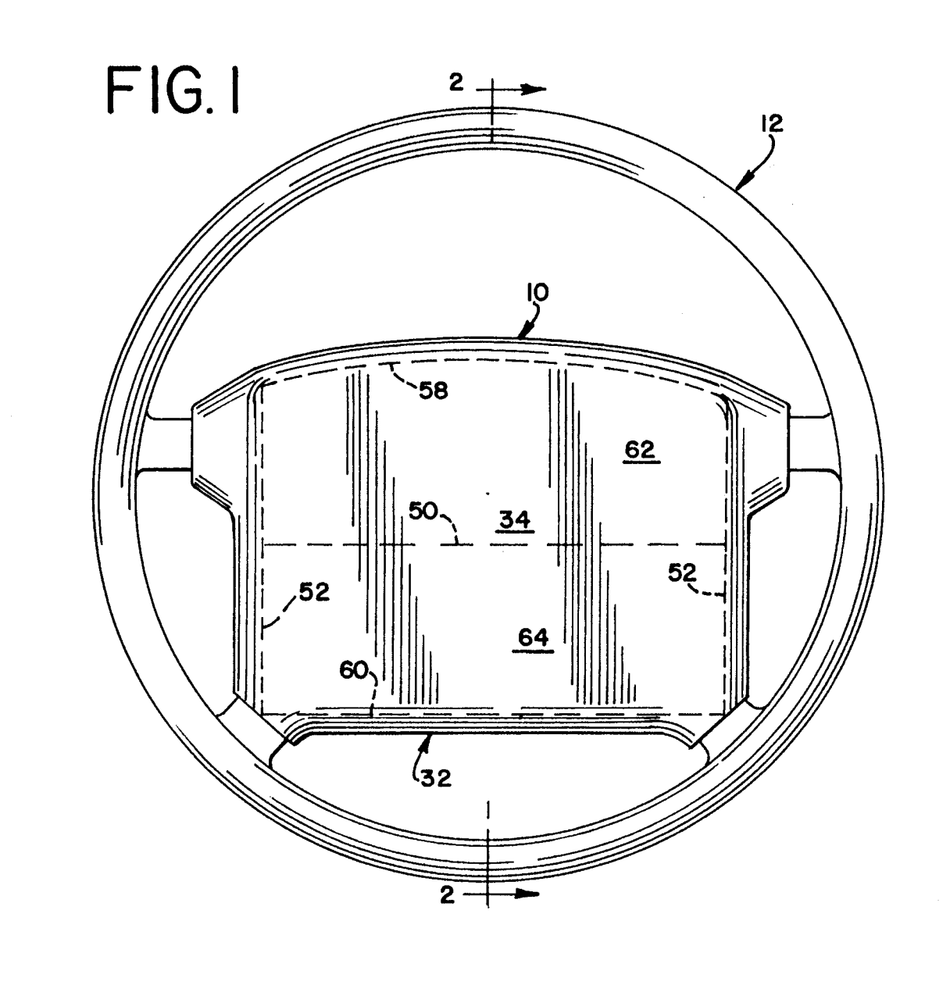
FIG. 1 is a front elevational view of a new and improved air bag container constructed in accordance with the features of the present invention and illustrated as mounted in place on the steering wheel of a vehicle.

Along an upper edge portion of the front wall 48 between the enlarged apertures 55 is provided a line of relatively wide slots 58 corresponding to an upper hinge axis of the container 10. Similarly, between the enlarged apertures 57 along the lower edge of the front wall 48 there is provided a line of relatively wide lower edge slots 60 corresponding to a lower hinge axis of the container 10. The center line of slots 50, the upper line of slots 58 and the lower line of slots 60 are generally parallel of each other and identify lines of fracture in the front wall 34 of the front cover 32 of the air bag container 10 when the air bag 14 is rapidly deployed by inflation. These lines of intended fracture are shown in dotted line form on FIG. 1 and divide the front wall 34 of the cover member 32 into an upper panel or door 62 and a lower panel or door 64, both of generally rectangular shape. The upper line of slots 58 and lower line of slots 60 generally define elongated axes of hinges for supporting and retaining the upper and lower panels or doors 62 and 64 when the panels are fractured away from one another along the centerline 50 during deployment of the air bag 14. Moreover, fracture also occurs along the vertical lines of opposite edge slots 52 in the outer surface of the front wall 34.

Figure 7:
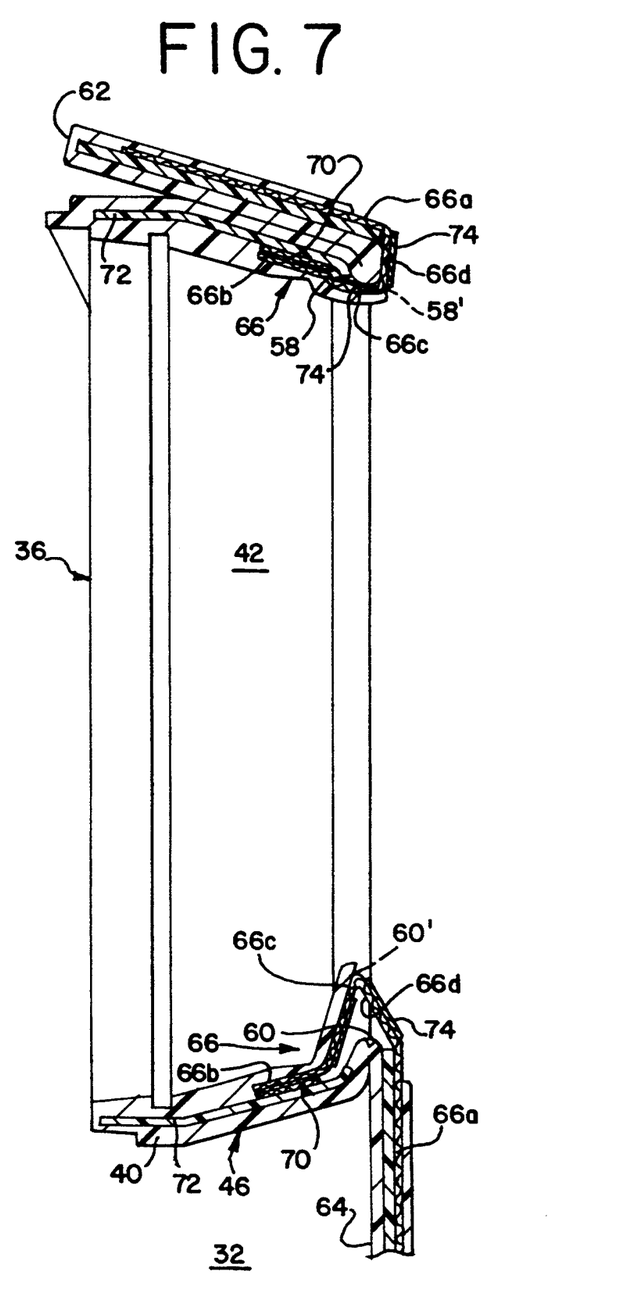
FIG. 7 is an enlarged fragmentary vertical cross-sectional view like FIG. 2A, showing the hinges and respective cover doors or panels after a deployment of the air bag has taken place.

In accordance with the features of the present invention, the air bag container 10 includes a pair of new and unique hinges 66 constructed from strips of tough, strong, flexible, resilient, wovenscrim material formed of resinous plastic fibers such as that sold under the trademark "NYLON". The scrim material is woven with an open weave as shown in FIG. 4 and is especially adapted for positively retaining the upper and lower panels or doors 62 and 64 to a fixed peripheral edge wall 72 of the front cover member 32 during and after deployment of the air bag 14 as shown in FIG. 7. As shown in FIG. 4, the scrim material of the hinges 66 extends longitudinally between the enlarged apertures 55 along the upper hinge line 58 and between the enlarged apertures 57 along the lower hinge line 60.

Each hinge 66 includes a relatively large size first section 66a adapted to be secured to either an upper panel 62 or lower panel 64 in the front wall 34 of the front cover member 32. As illustrated in FIGS. 4 and 6, the first hinge sections 66a are adapted to bear against the back side face of the front wall 48 of the reinforcing element 46 and because both the reinforcing element and the hinge material have a large area of open space, the plastic resin used in the injection molding process to form the front cover member 32 can flow through and bond together the first section 66a of each hinge 66 with the front wall 48 as the outer layer of resinous plastic material making up the front wall 34 of the front cover member 32 is molded-in-place. The hinges 66 also include second sections 66b initially secured in place by means of staples or the like 68 to a layer of open weave reinforcing tape 70 secured around the inside peripheral wall 72 of the reinforcing element 46 as best shown in FIGS. 4 and 6. Because both the hinge sections 66b and the tape 70 are made of open weave material, injection molding plastic resin can flow through and around these elements to positively secure the hinge sections 66b in a molded-in-place condition with the respective upper and lower walls 38 and 40 of the front cover member 32.

Each hinge 66 is also provided with a pair of integral, folded over webs or hinge portions 66c and 66d, which web portions are arranged in overlying relationship with one another and with a first section 66a (FIGS. 4 and 6) before the injection of molded plastic material takes place.

The overlying web portions 66c and 66d provide flexibility and strength to permit relatively wide, angular movement during opening of the upper panel 62 (approximately 270°, FIG. 7) and the lower panel 64 (approximately 180°, FIG. 7). Both hinges 66 thus positively secure the doors or panels 62 and 64 to the fixed side wall structure 36 of the front cover member 32 during and after deployment of the air bag 14. The panels are permanently secured to the peripheral fixed side wall 36 even though fracture of the front wall 34 into separate panels 62 and 64 has occurred and the panels have been rapidly pivoted along fold or hinge lines 58 and 68 during deployment of the air bag 14. This arrangement ensures that the air bag 14 itself is not punctured or cut during deployment and that the cover doors or panels 62 and 64 do not separate permanently and fly about or become dangerous projectiles with uncontrollable trajectories during rapid air bag deployment.

Referring to FIGS. 6 and 7, in order to permit free pivotal movement around longitudinally extending fold lines (generally the same as the fracture lines 58 and 60) and free pivotal movement about inner parallel fold lines 58' and 60' at the folds between web portions 66c and 66d, strips of impervious tape or plastic material 74 are interposed between the folded over, overlying web portions 66c and 66d of each hinge 66 and between the overlying hinge portions 66d and the first sections 66a of each hinge 77 adjacent the respective panels or doors 62 and 64. The impervious strips of tape 74 prevent resin from filling in between the overlying webs of the open weave scrim material of the hinges 66 so that free pivotal movement along the fold lines 58, 58' and 60, 60' is achieved without any retarding action caused because of solidified resin.

Figure 3:
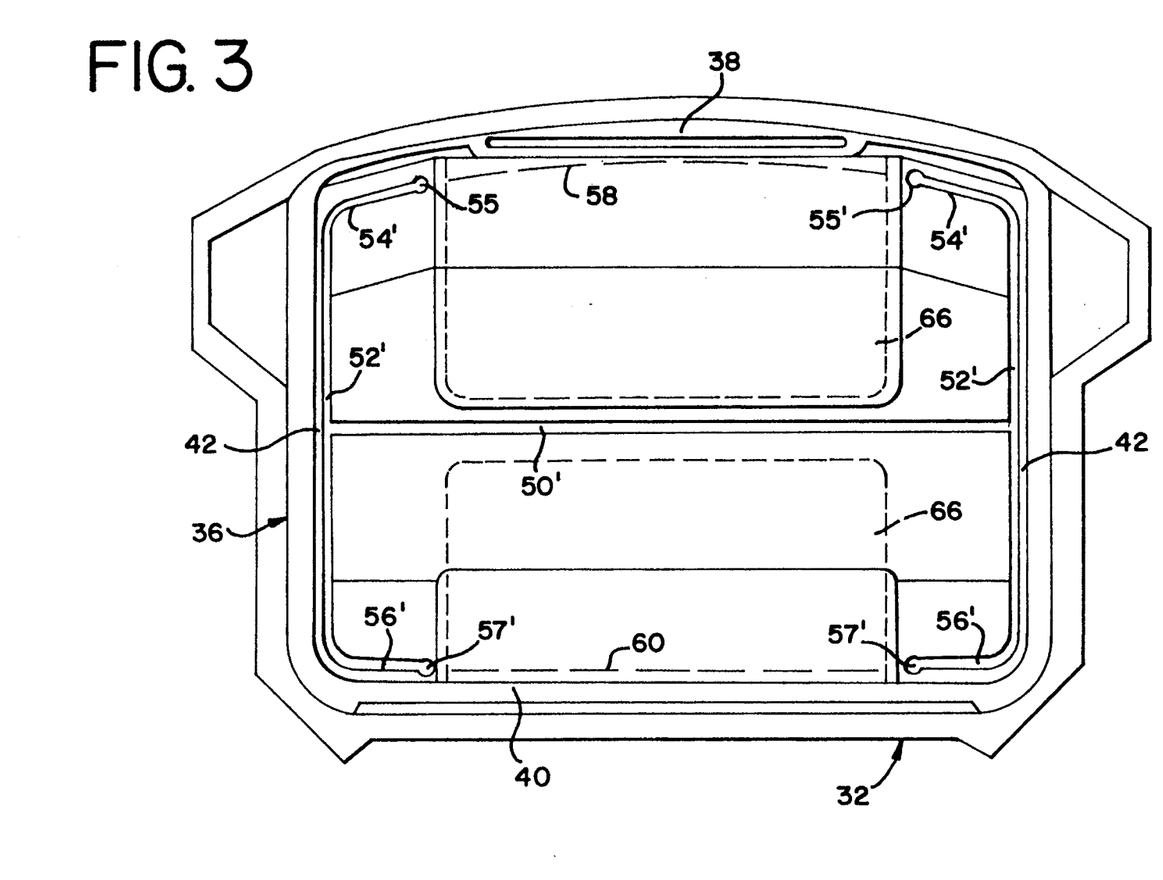
FIG. 3 is a rear elevational view of a front cover of the air bag container.

Referring now to FIG. 3, which illustrates a back side view of the front cover member 32 after the injection molding process has taken place, it will be seen that the back surface of the cover member is provided with elongated indentations or grooves 50', 52', 54' 55', 56' and 57' which grooves provide for a reduced wall thickness overall of the molded plastic front cover member 32 along the lines of intended fracture. The inside grooves are positioned opposite and corresponding to the lines of slots 50, 52, 54, 55, 56 and 57 provided in the plastic reinforcing element 46. The resultant injection molded, resinous plastic structure is thus strong and stiff and provides a nice appearing front wall or surface 34 for the air bag container 10 mounted on a steering wheel 12 of a motor vehicle and at the same time concentric lines of stress to locate desired lines of fracture to ensure that rapid deployment of the air bag 14 can occur with minimal interference.

Figure 8:
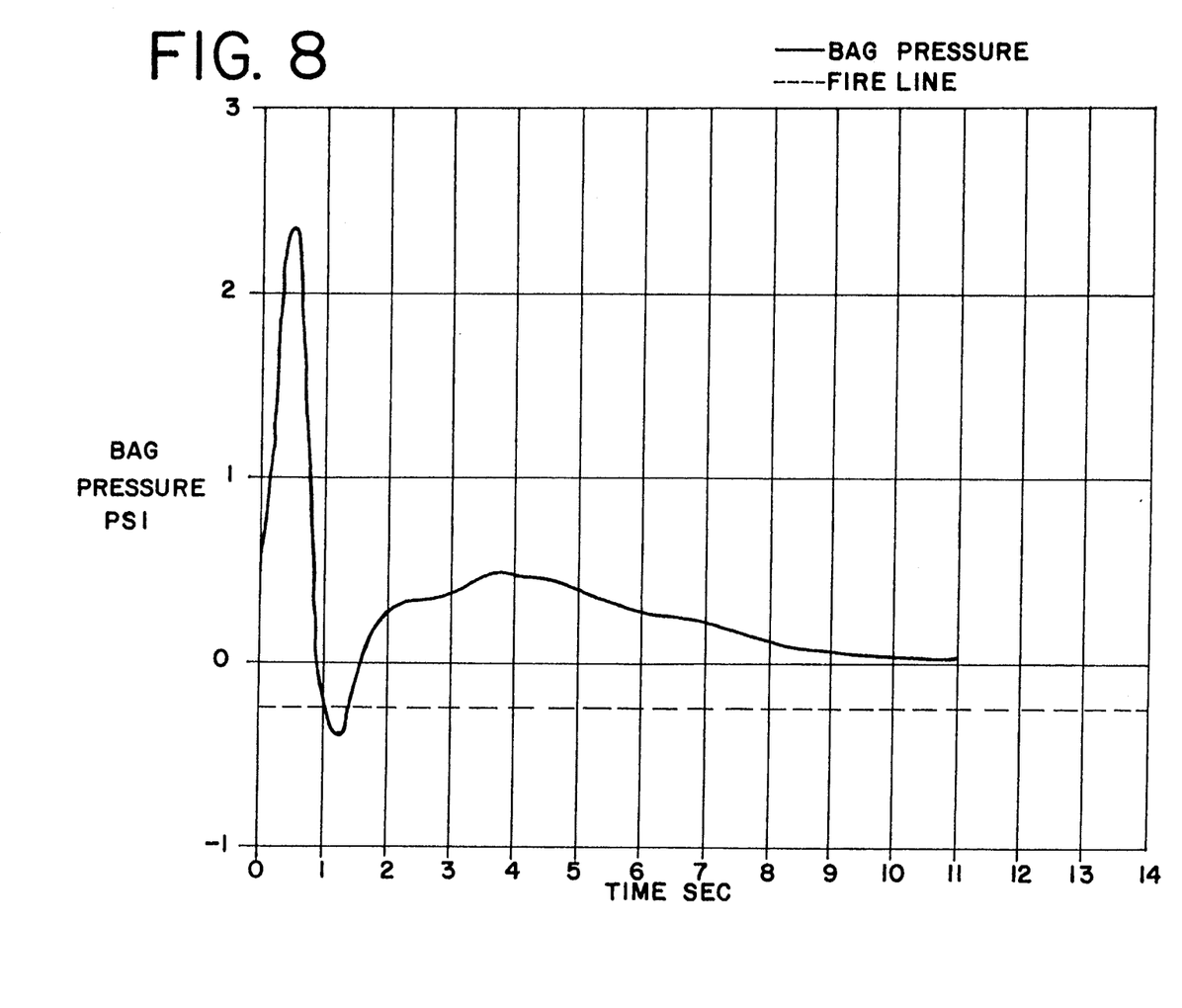
FIG. 8 is a graph representing the pressure within the air bag versus time after initiating air bag deployment.

FIG. 8 represents the pressure in the air bag 14 during a deployment thereof and it should be noted that initially the pressure is very high. The hinges 66 are strong, resilient and flexible to withstand this high stress without failure and because the portions 66a and 66b of the hinges are molded-in-place exceptional holding power is provided. Moreover, the need for a metal reinforcing element or hinge is eliminated in the container 10 of the present invention.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A hinge for a cover of a container adapted to be pivotally opened by an inflating air bag contained therein, comprising:

a strip of scrim formed of high strength elongated flexible fibers and secured along opposite edge portions of said strip to said cover and a wall of said enclosure, respectively, said strip including an integral hinge portion between inner edges of said opposite edge portions and joined with at least one of said edge portions along a fold line wherein said hinge portion is in an overlying relationship with said one edge portion while said cover is in a closed position with said air bag in an uninflated condition and hingedly movable to unfold along said fold line to an open position away from said overlying relationship upon inflation of said air bag.

2. The hinge of claim 1, wherein:

said strip comprises an open weave mesh of said flexible fibers; and at least one of said cover and said wall is formed of resinous plastic material molded on said open weave mesh.

3. The hinge of claim 2, wherein:

said strip of scrim includes a plurality of openings between said fibers forming said mesh and said resinous plastic material penetrates said openings to form a high strength bond between said strip and said one of said cover and said wall.

4. The hinge of claim 3, wherein:

at least said one of said cover and said wall includes a reinforcement member embedded in said molded resinous plastic material.

5. The hinge of claim 4, wherein:

said reinforcement member includes a plurality of openings and said resinous plastic material penetrates said openings to form a high strength bond between said stiffening member and said one of said cover and said wall.

6. The hinge of claim 3, including:

impervious sheet means interposed between said one of said opposite edge portions and a face of said integral hinge portion of said strip of scrim whereby penetration of said resinous plastic material forming said cover and said wall between areas of one edge portion and said hinge said portion disposed in overlying relationship therewith is precluded so that unfolding along said fold line is not prevented when said air bag is inflated.

7. The hinge of claim 6, including:

impervious sheet means on an opposite face of said hinge portion.

8. The hinge of claim 7, wherein:

said hinge portion of said strip of scrim includes a plurality of hinge elements in folded overlying relationship a plurality of said fold lines in parallel with one another.

9. The hinge of claim 8, wherein:

said impervious sheet means is interposed between an adjacent pair of hinge elements to prevent adhesion between said elements so that relative pivotal unfolding movement along said fold lines can occur when said air bag is inflated.

10. The hinge assembly of claim 9, wherein:

said resinous plastic material of said cover and said wall is integrally molded to exposed surfaces of said strip of scrim on said cover and said wall.

11. A container for an inflatable air bag including:

a wall and a cover intersecting along an edge of said enclosure; and hinge means secured to an inside face of said wall and said cover for retaining attachment between the same during rapid inflation of said air bag;

said hinge means comprising a piece of scrim formed of strong, woven, flexible fibers having a first section attached to said cover, a second section attached to said wall, and a hinge section intermediate of said first and second sections, said hinge section integrally joined with at least one of said first and second sections along a fold line extending along said edge of said container and unfoldable along said fold line with respect to said one section from an overlying relationship toward an outwardly extended relationship when said air bag is inflated.

12. The container of claim 11, wherein:

said cover includes a door panel having at least one edge spaced away from said hinge means, said edge lying adjacent an inside groove formed in said cover for providing a reduced wall thickness therein to facilitate the separation of said panel from said cover along said one edge permitting pivotal opening movement of said panel along said fold line of said hinge means upon inflation of said air bag.

13. The container of claim 11, wherein:
said wall of said container includes a plurality of spaced apart side walls joining said cover on opposite edges of said container, a plurality of said panels in said cover having confronting edges along opposite sides of said inside groove, a plurality of said hinge means for securing a panel to a respective side wall for opening upon fracturing of said cover between said panels along said inside groove permitting said panels to pivotally open simultaneously with unfolding of said hinge means along said fold lines of respective hinge means along said opposite edges of said container.

14. The container of claim 13, wherein:
said inside groove on said cover extends around a peripheral edge of at least one of said panels to points adjacent opposite ends of said hinge means associated with said one panel.

15. The container of claim 12, wherein:
said wall includes an outer surface engageable by an outer surface of said panel for limiting he pivotal movement of said panel when said air bag is inflated.

16. The container of claim 11, wherein:
said intermediate hinge section of said hinge means includes at least two layers of scrim in overlying relation joined along a second fold line spaced from said first mentioned fold line.

17. The container of claim 16, including:
strip means interposed between said layers of scrim in overlying relation for preventing adhesion therebetween to facilitate unfolding pivot action along said second fold line while said air bag is inflated.

18. The container of claim 11, including:
strip means interposed between said hinge section and said one of said first and second sections of said hinge means in overlying relationship therewith for preventing adhesion therebetween to facilitate unfolding pivot action along said fold line while said air bag is inflated.

19. The container of claim 11, including:
strip means interposed between said hinge section and said one of said first and second sections of said hinge means in overlying relationship therewith for preventing adhesion therebetween to facilitate unfolding pivot action along said first mentioned fold line while said air bag is inflated.

20. The container of claim 11, wherein:
said scrim comprises a strip of open weave mesh of said flexible fibers; and
at least one of said cover and said wall is formed of resinous plastic material molded on said open weave mesh.

21. The container of claim 20, wherein:
said strip of scrim includes a plurality of openings between said fibers forming said mesh and said resinous plastic material penetrates said openings to form a high strength bond between said strip and said one of said cover and said wall.

22. The container of claim 21, wherein:
said cover and said wall includes a reinforcement member embedded in said molded resinous plastic material for reinforcing said container.

23. The hinge of claim 22, wherein:
said stiffening member includes a plurality of openings and said resinous plastic material penetrates said openings to form a high strength bond between said stiffening member and said cover and said wall.

* * * * *